United States Patent [19]
Germanetti

[11] Patent Number: 5,908,485
[45] Date of Patent: Jun. 1, 1999

[54] FLIGHT INDICATOR WITH TESTING MEANS FOR A HELICOPTER

[75] Inventor: Serge Alexandre Marc Germanetti, Marseille, France

[73] Assignee: Eurocopter, Marignane Cedex, France

[21] Appl. No.: 08/974,077

[22] Filed: Nov. 19, 1997

[30] Foreign Application Priority Data

Nov. 19, 1996 [FR] France .................................. 96 14067

[51] Int. Cl.$^6$ .................................................. G01C 21/00
[52] U.S. Cl. .................................... 75/178 H; 364/551.01
[58] Field of Search ................................ 73/178 H, 187, 73/178 R; 340/945, 946, 963; 244/17.3; 364/424, 424.01, 424.03, 426, 551.01, 551, 424.012, 424.034

[56] References Cited

U.S. PATENT DOCUMENTS

| | | | |
|---|---|---|---|
| 4,763,285 | 8/1988 | Moore et al. | 364/551 |
| 4,780,838 | 10/1988 | Adelson | 73/178 H |
| 4,787,053 | 11/1988 | Moore et al. | 364/551.01 |
| 5,079,946 | 1/1992 | Motamedi et al. | |
| 5,257,190 | 10/1993 | Crane | 364/424.03 |
| 5,608,627 | 3/1997 | Lecomte et al. | |

FOREIGN PATENT DOCUMENTS

| | | |
|---|---|---|
| 0482692 | 10/1990 | European Pat. Off. |
| 1416344 | 2/1964 | France |
| 2710026 | 3/1995 | France |
| WO 96/13764 | 5/1996 | WIPO |

*Primary Examiner*—William Oen
*Attorney, Agent, or Firm*—Fisher, Christen & Sabol

[57] ABSTRACT

A flight indicator for an aircraft, intended to give the power margin available on at least one engine of the aircraft. The indicator includes sensors (2, 3, 4) capable of delivering data relating to various monitored parameters of the engine, means (5) of processing the data coming from the sensors (2, 3, 4), and display (6) showing the processed data relating to that parameter among the monitored engine parameters, whose current value is closest to the limiting value for the parameter. The indicator includes a testing device (12) for testing the analytical consistency between at least one of the parameters and at least one other of the parameters.

5 Claims, 1 Drawing Sheet

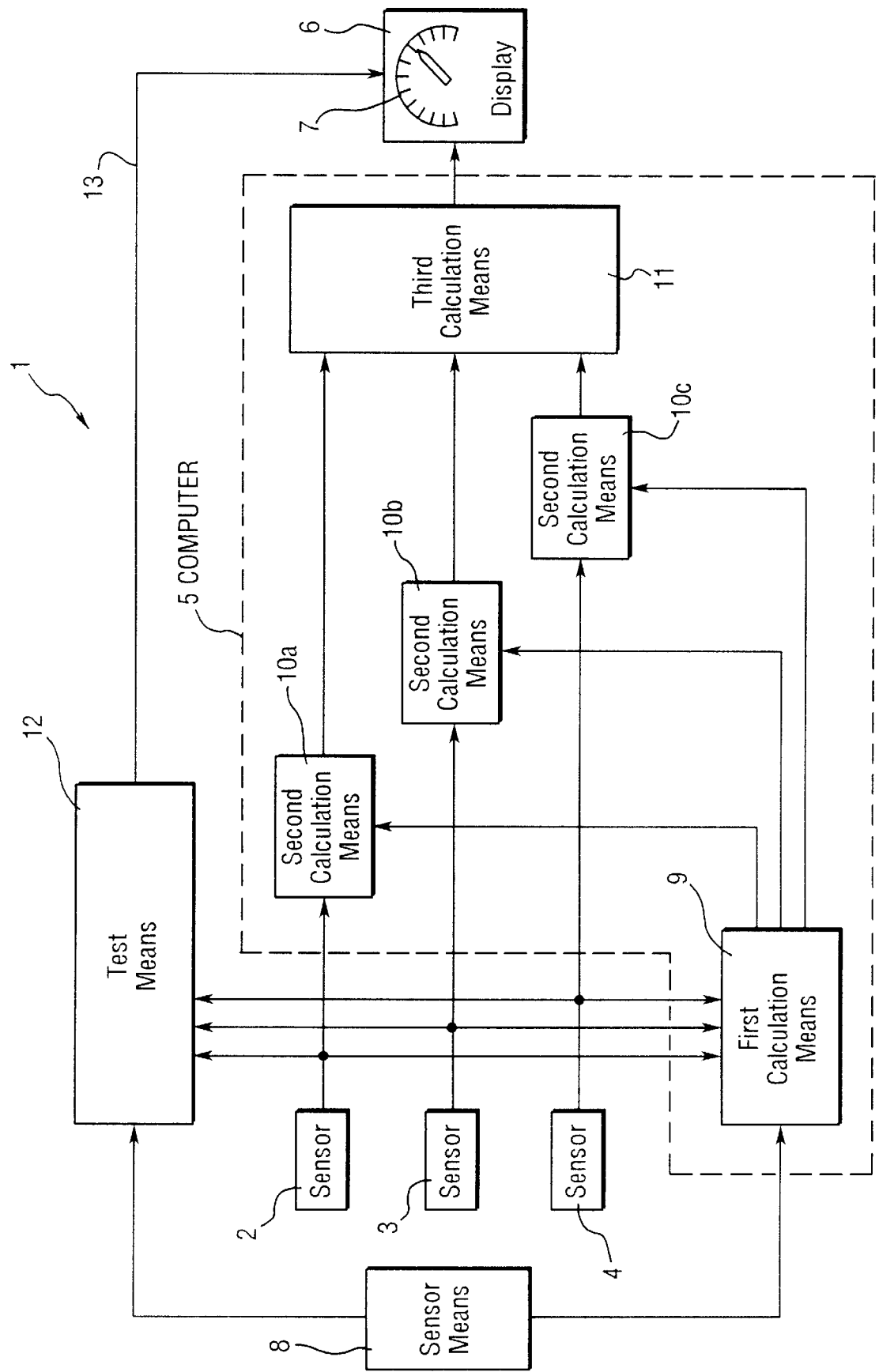

FLIGHT INDICATOR WITH TESTING MEANS FOR A HELICOPTER

The present invention relates to an aircraft flight indicator.

Such an indicator is more particularly designed for a rotary-wing aircraft, especially a helicopter.

A helicopter is flown monitoring a great many instruments on the control panel, which instruments for the most part represent the operation of the engine and associated components and the aircraft. For physical reasons, there are many limitations that the pilot has to take into account at every moment during the flight. These various limitations generally depend on the phase of flight and on the external conditions.

Most helicopters built these days are equipped with one or two turbine engines, usually with a free turbine. The power is therefore drawn off from a low-pressure stage of the turbine, which stage is mechanically independent of the compressor assembly and of the high-pressure stage of the turbine. As a turbine engine runs at between 30,000 and 50,000 revolutions per minute, a special reduction gearbox—the main gearbox—is needed for connecting it to the rotor(s).

The thermal limitations both on the engine and on the main gearbox allow three speeds at which the engine is used to be defined:

the take-off speed which in general is not a limitation on the engine, but on the maximum power that the gearbox can absorb without being damaged in any way, bearing in mind its inherent cooling capability: this is then known as the maximum take-off power (PMD) (note that for some aircraft, the take-off speed corresponds to a limitation on the engine once it is used for a certain length of time), the maximum continuous speed for which at no time are either the gearbox capabilities or the capabilities resulting from the maximum permissible heating past the high-pressure blading of the first turbine stage exceeded: this is the maximum continuous power (PMC), the maximum transient speed, defined by the governor stops: this is then known as the maximum transient power (PMT).

The engine test engineer, through calculation or testing, establishes the curves of available power of a turbine engine as a function of the altitude and of the temperature, and does this for each of the three speeds defined hereinabove.

The limitations given are generally monitored using three parameters: the speed (Ng) of the gas generator, the engine torque (Cm) and the temperature (T4) at which the gases are ejected at the inlet to the free turbine.

There is already known, from French Patent Application 96 07040, filed on Jun. 7, 1996, an aircraft flight indicator intended to give the power margin available on at least one engine of the aircraft as a function of the flight conditions, this indicator comprising:

sensors capable of delivering data relating to various monitored parameters of the engine, means of processing the data coming from said sensors, and display means showing, on a display screen, the processed data relating to that parameter among said monitored engine parameters, whose current value is closest to the limiting value for said parameter.

The present invention constitutes an improvement to this indicator.

Thus, the flight indicator, of the type described hereinabove, is noteworthy according to the invention in that there are means for testing the analytical consistency between at least one of said parameters and at least one other of said parameters.

Bearing in mind, in particular, the fact that such consistency tests are carried out, according to another feature of the invention, under stabilized flying conditions, flying safety is thus improved. For example, in the case of a helicopter mission which, by way of illustration, is made up of 80% of the time as stabilized transport flight and 20% in maneuvering (tactical flight close to the ground, among other things), and where safety provided for 80% of the time involves a safety rate of $10^{-7}$/hour, analytical monitoring (analytical consistency test) may make it possible to increase the safety rate by a factor of 10, namely $10^{-7}/10=10^{-8}$/hour.

In particular, for a flight indicator intended for a rotary-wing aircraft, especially a helicopter, which has at least one turbine engine for driving at least one rotor, in which the monitored engine parameters are:

the speed (Ng) of the gas generator, the temperature (T4) at which the gases are ejected at the inlet to the free turbine, and the engine torque (Cm), said means for testing the analytical consistency carry out a test for consistency of the gas-ejection temperature (T4) and engine torque (Cm) with respect to the speed (Ng) of the gas generator, respectively.

Furthermore, the overall analytical consistency test is valid if the T4/Ng consistency test and/or the Cm/Ng consistency test is/are valid.

What is more, said consistency tests can be carried out under stabilized flying conditions. The advantage to be had in doing this is that the engine need be modeled only in the stabilized mode, which saves on memory size, gives better processing capability, and better adjustment facilities.

In addition, said consistency tests are preferably carried out taking the ambient pressure (PO) and the ambient temperature (TO) and/or any drawing of power from the aircraft engine into account. The advantage to be had in this last point is that it narrows the monitoring thresholds down to values that make it possible to guarantee that the engine will not be damaged by any remaining deviation in the range if the inconsistency detection does not react.

The single FIGURE of the appended drawing, which is a block diagram of the flight indicator according to the invention, will make it easy to understand how the invention can be achieved.

The aircraft flight indicator according to the invention is intended to give (display) the power margin available on at least one engine of the aircraft as a function of the flight conditions. Although it can be used in other types of aircraft, the following description will refer to the specific example of a rotary-wing aircraft (helicopter) with at least one turbine engine for driving at least one rotor, with the specific monitored engine parameters associated with this example (one engine and one rotor).

In the case described here, the following parameters will be taken into account:

Ng—rotational speed or speed of the gas generator,

T4—temperature at which the gases are ejected at the inlet to the free turbine,

Cm—engine torque.

Furthermore, it is clearly understood that in the case of a helicopter with several engines, such an indicator can be used for each of said engines.

As can be seen in the single FIGURE, the indicator 1 according to the invention comprises various sensors 2, 3, 4 relating to the various parameters mentioned hereinabove, respectively, and capable of delivering the information corresponding to these various parameters to a computer 5 which processes said data. Display means 6 show, on a display screen 7, the processed data relating to that parameter, known as the "limiting parameter", from among said monitored engine parameters, whose current value is closest to the limiting value for said parameter. For this reason, the indicator 1 will also be known hereafter as a "first limitation instrument", or "IPL" for short.

As is described in detail in French Patent Application 96 07040, the display may adopt different modes depending on the phase of flight or flight conditions, or the pilot's wishes. In the "normal" case, the display, as shown in the FIGURE, will be in the form of a dial with just one pointer, representing the current value of the limiting parameter.

The way in which the limiting parameter is determined is described in detail in the aforementioned French Patent Application, to which reference will be made. Studying the FIGURE of the present application, it will simply be recalled that taking into account the parameters PO [altitude (pressure in millibar)] and TO (outside air temperature in K) supplied by the sensor means 8 and, of course, the parameters Ng, Cm and T4, the first calculation means 9 making it possible to calculate the corresponding limitations $Ng_{lim}$, $Cm_{lim}$ and $T4_{lim}$, the respective values of which are linearized in the second calculation means 10a, 10b and 10c, this linearization being associated with a scaling of the parameters to fit the range defined by the limiting values that correspond to the maximum powers (continuous, take-off, transient). Next, the third calculation means 11 provides the identity of the limiting parameter, whose value is converted into % torque.

According to the invention, means 12 are furthermore provided for testing the analytical consistency of the gas-injection temperature (T4) and engine torque (Cm) with respect to the speed (Ng) of the gas generator, respectively. For this, the means 12 receive T4, Cm and Ng together with PO, TO as inputs; the various calculations are carried out in the test means 12, i.e. $T4=F_{TO,PO}(Ng)$ and $CM=G_{TO,PO}(Ng)$, as will be seen in detail later, and a valid (or non-valid) signal is sent to the display means 6 by the link 13.

It will already have been noted that the overall analytical consistency test is valid if the T4/Ng consistency test and the Cm/Ng consistency test are valid.

In other words, the T4/Ng test value and the Cm/Ng test value have respectively to lie between determined minimum and maximum values, as will be seen in greater detail later.

Furthermore, the consistency tests are carried out taking the ambient pressure (PO) and ambient temperature (TO) and any power drawn off from the aircraft engine into account.

The analytical consistency test function for the parameters Ng, T4 and Cm determines the variations that connect the parameters Ng, T4, Cm, PO, TO in static phase. From this, a consistent range of operation between lower and upper limits is deduced. If one of the parameters leaves this range, a Boolean consistency variable is activated.

It will be noted that the consistency tests are carried out only when the parameters have stabilized, otherwise the result of the last encountered stable phase of flight is retained. For that, an appropriate algorithm identifies the phase of flight so that the consistency test is set in operation only in stabilized conditions.

The variables used are as follows:
inputs:
Ng—rotational speed or speed of the gas generator in % (i.e. Ng expressed in revolutions per minute/Ng 100%)

T4—temperature at which the gases are ejected at the inlet of the free turbine in K (i.e. temperature of the gases in °C.+273)
Cm—engine torque in % (i.e. torque expressed in mdaN/torque 100%)
PO altitude (pressure in millibar)
TO external air temperature in K (i.e. external air temperature in °C.+273)
Reserve 1, Boolean variable in reserve
Reserve 2, Boolean variable in reserve
Reserve 3, Boolean variable in reserve
Reserve (vi), indicated speed
Ntl—speed of free turbine in revolutions per minute, equivalent to rotor speed
Loss of motive power T4—losses of motive power on T4
Loss of motive power Cm—losses of motive power on Cm
P2 tapping—equivalent value of the diameter of the P2 tapping orifice in mm
U,I, voltage and current corresponding to the power take-off from the gas generator
intermediate variables:
PH take-off power taken off the gas generator in kW
Tapping activity—Boolean variable relating to the activity of tapping off (P2 or power) ("active", "inactive")
T4/Ng consistency test—Boolean variable ("yes", "no")
Ng/Cm consistency test—Boolean variable ("yes", "no")
Test range, Boolean variable ("yes", "no")
output:
Consistency, Boolean variable for monitoring the sensors ("yes", "no").

In all of what follows, the following notation will be used:
$variable_{(n)}$, to denote the variable during the current cycle
$variable_{(n-1)}$, to denote the variable in the previous cycle
Thus, $Ng_{(n)}$ is the value of Ng in the current cycle ($Ng_{(n)}=Ng$) and $Ng_{(n-1)}$ is the value of Ng in the previous cycle. In addition $\delta T$ is the sampling period, $\tau i$ is the time constant for the filter i.

The corresponding algorithm can therefore be expressed as follows, which corresponds to the digitizing of a first-order differential filter of the type $Zp/(1+Zp)$:

calculating the test range:

$$Ng_{f(n)}=e^{-\delta T/t1} \times Ng_{f(n-1)}+(1-e^{-\delta T/t1}) \times Ng_{(n)}$$

$$Ng_w = Ng_{(n)} - Ng_{f(n)}$$

$$T4_{f(n)}=e^{-\delta T/t2} \times T4_{f(n-1)}+(1-e^{-\delta T/t2}) \times T4_{(n)}$$

$$T4_w = T4_{(n)} - T4_{f(n)}$$

$$Cm_{f(n)}=e^{-\delta T/t3} \times Cm_{f(n-1)}+(1-e^{-\delta T/t3}) \times Cm_{(n)}$$

$$Cm_w = Cm_{(n)} - Cm_{f(n)}$$

(Ng, T4 and Cm filtered by the respective filters 1,2,3)
if $Cm.k8<Cm$ and $|Ng_w|<\epsilon_{Ng}$ and $|Cm_w|<\epsilon_{Cm}$ and $|T4_w|<\epsilon_{T4}$ and (P2 tapping) does not change state
then the phase is stabilized and the test range is "yes"
otherwise the phase is not stabilized and the test range is "no"
consistency tests:
if the test range is "yes" for t seconds
then PH takeoff=calcul.k1×U×I
test for consistency between Ng and T4
if P2 tapping<calcul.k2
then P2 tapping activity="inactive"
XP2=calcul.k0
DP2=calcul.k0 otherwise P2 tapping activity="active"
   XP2=calcul.k3
   DP2=value interpolated for 4 discreet values of P2 tapping
if PH takeoff<calcul.k4
then PH takeoff activity="inactive"
   XPH=calcul.k0
   DPH=calcul.k0
otherwise PH takeoff activity="active"
   XPH=calcul.k5
   DPH=value interpolated for 5 discreet values of PH takeoff
Tapping activity=PH takeoff activity or P2 tapping activity
   T4C=interpolated value, a function of Ng and TO,
   XT4=calcul.k6
T4 calcul=T4C+(XT4+XP2+XPH)×(PO/POO)$^{1/5.255}$+DP2+DPH+loss of motive power T4
T4/Ng test value=100×(T4−T4calcul)/calcul.k7
if tapping activity="active"
then
   min T4/Ng test value=calcul.k8
   max T4/Ng test value=calcul.k9
otherwise
   min T4/Ng test value=calcul.k10
   max T4/Ng test value=calcul.k11
if min T4/Ng test value<T4/Ng test value<max T4/Ng test value
then T4/Ng consistency test="yes"
otherwise T4/Ng consistency test="no"
test for consistency between Ng and Cm
PWS=value interpolated from a PWS table
DPW=value interpolated from a DPW table
XX=value interpolated from an XX table
Wcalcul=[PWS+DPW×(Ntl−calcul.k12)/calcul.k12]×(PO×POO)$^{(1+XX/1000)}$+motive power loss Cm
Cm calcul=calcul.k13×Wcalcul/Ntl
Cm/Ng test value=100×(Cm−Cm calcul)/calcul.k14
if tapping activity="active"
then
   min Cm/Ng test value=calcul.k15
   max Cm/Ng test value=calcul.k16
otherwise
   min Cm/Ng test value=calcul.k17
   max Cm/Ng test value=calcul.k18
if min Cm/Ng test value<Cm/Ng test value<max Cm/Ng test value
then Cm/Ng consistency test="yes"
otherwise Cm/Ng consistency test="no"

Furthermore, if the test range is "no", the T4/Ng and Cm/Ng consistency tests retain the respective values of the tests carried out in the latest earlier stable phase.
calculating IPL validity
   IPL consistency=NO [(T4/Ng consistency test=false AND Cm/Ng consistency test=false) for Ts] In other words, IPL consistency is verified if the T4/Ng consistency test and/or the Cm/Ng consistency test is/are true.

It will be noted that all the notations which contain the ki index represent constants which are specific to a given individual aircraft.

Furthermore, in the foregoing, the following definitions need to be taken into account:
   T4C=theoretical value of T4, excluding tappings (function of TO and Ng),
   DP2 and XP2=contributions of the P2 tapping (air pressure P2) to the increase in T4 compared with T4 theoretical,
   DPH and XPH=contributions of the power takeoff to the increase in T4 compared with T4 theoretical,
   DPH and DP2 are tabulated coefficients which are functions of Ng and TO which involve a correction proportional to atmospheric pressure,
   XPH and XP2 are tabulated coefficients which are functions of Ng and TO which involve an additional correction,
   W calcul=value of the nominal available theoretical power,
   PWS=additive correction which is a function of the current values of Ng and TO,
   DPW=a proportional coefficient for correcting the nominal power, which is a function of the deviation in $N_{tl}$ (free turbine speed of rotation) from its nominal value,
   XX=exponential correction coefficient with respect to the current static pressure.

What is claimed is:

1. A flight indicator for a helicopter having at least one turbine engine with a gas generator and a free turbine, said flight indicator being intended to give the power margin available on said engine and comprising:
   (a) sensors capable of delivering current values relating respectively to the following three parameters:
      (i) the speed of said gas generator,
      (ii) the temperature at which the gases are ejected at the inlet to said free turbine, and
      (iii) the engine torque,
   (b) computing means for comparing said current values to respective limiting values,
   (c) display means showing on a display screen, the current value relating to that parameter, among said three parameters, whose current value is closest to the respective limiting value, and
   (d) testing means carrying out tests for the analytical consistency of the values of the gas-ejection temperature and engine torque with respect to the values of the speed of the gas generator, respectively.

2. The flight indicator as claimed in claim 1, wherein the overall analytical consistency test is valid if the gas-ejection temperature/speed of gas generator test and engine torque/speed of gas generator test are valid.

3. The flight indicator as claimed in claim 1, wherein said consistency tests are carried out under stabilized flying conditions.

4. The flight indicator as claimed in claim 1, wherein said consistency tests depend upon the pressure and the temperature outside of said helicopter.

5. The flight indicator as claimed in claim 1, wherein said consistency tests depend upon the power tapping from said engine.

* * * * *